United States Patent [19]

Fujita et al.

[11] Patent Number: 5,648,427
[45] Date of Patent: Jul. 15, 1997

[54] CURABLE COMPOSITION

[75] Inventors: Masayuki Fujita, Takago; Hiroshi Wakabayashi, Kobe, both of Japan

[73] Assignee: Kanegafuchi Kagaku Kogyo Kabushiki Kaisha, Osaka, Japan

[21] Appl. No.: 575,466

[22] Filed: Dec. 20, 1995

Related U.S. Application Data

[63] Continuation of Ser. No. 261,250, Jun. 14, 1994, abandoned, which is a continuation of Ser. No. 99,394, Jul. 30, 1993, abandoned, which is a continuation of Ser. No. 903,147, Jun. 24, 1992, abandoned.

[30] Foreign Application Priority Data

Jun. 25, 1991 [JP] Japan ................................ 3-152878

[51] Int. Cl.$^6$ ...................................................... C08L 83/00
[52] U.S. Cl. ............................................................ 525/104
[58] Field of Search ............................. 515/104; 517/218

[56] References Cited

U.S. PATENT DOCUMENTS

| | | | |
|---|---|---|---|
| 3,865,759 | 2/1975 | Smith | 525/100 |
| 3,971,751 | 7/1976 | Isayama et al. | 260/37 R |
| 4,323,488 | 4/1982 | Takago et al. | 528/32 |
| 4,595,623 | 6/1986 | Du Pont et al. | 428/195 |
| 4,735,829 | 4/1988 | Hirose et al. | 427/387 |
| 4,916,173 | 4/1990 | Otloski et al. | 523/219 |
| 5,051,463 | 9/1991 | Yukimoto et al. | 524/306 |

FOREIGN PATENT DOCUMENTS

| | | |
|---|---|---|
| 0264072 | 4/1988 | European Pat. Off. . |
| 3100746 | 7/1982 | Germany . |
| 1-202683 | 8/1989 | Japan . |

*Primary Examiner*—Ralph H. Dean
*Attorney, Agent, or Firm*—Varndell Legal Group

[57] ABSTRACT

A curable composition which comprises (A) an oxyalkylene polymer having a silicon-containing group(s) that has a hydroxy group(s) and/or a hydrolyzable group(s) bonded to the silicon atom(s), and can be crosslinked by forming siloxane bond, and (B) hollow microspheres of vinylidene chloride polymer whose true specific gravity is 1 g/cm$^3$ or less.

3 Claims, No Drawings

CURABLE COMPOSITION

This application is a continuation of U.S. Ser. No. 08/261,250, filed Jun. 14, 1994, now abandoned, which is a continuation application of U.S. Ser. No. 08/099,394, filed Jul. 30, 1993, now abandoned, which is a continuation application of U.S. Ser. No. 07/903,147, filed Jun. 24, 1992, now abandoned.

BACKGROUND OF THE INVENTION

1. Field of the Invention

The present invention relates to a curable composition that comprises an oxyalkylene polymer having a silicon-containing group(s) that has a hydroxy group(s) and/or a hydrolyzable group(s) bonded to a silicon atom(s), and can be crosslinked by forming siloxane bond.

2. Description of the Related Art

The oxyalkylene polymer that comprises a silicon-containing group(s) having a hydroxy group(s) and/or a hydrolyzing group(s) bonded to a silicon atom(s), (to be referred to as a reactive silicon group(s) hereinafter) that can be crosslinked by forming a siloxane bond, is disclosed, for example, in Japanese Patent Publication, No. 52-72998 and U.S. Pat. No. 3,971,751.

Its typical example is a polymer represented by the general formula:

X"$_3$Si-(oxypropylene polymer)-SiX"$_3$

[where X" represents a hydrolyzable group such as a methoxy group].

An oxyalkylene polymer having a reactive silicon group (s) cures through forming a siloxane bond (Si—O—Si) between polymers by the action of moisture at room temperature like room temperature curable silicone rubber, and produces a rubber-like cured substance. This cured substance is so excellent in elongation property, strength and adhesiveness that it is used as sealants, adhesives and such.

This polymer may be used, for the purpose of lowering cost, as a composition to be mixed with a filler.

The addition of a filler, however, has been problematic: it increases the weight of the cured substance, and it does not lower the cost as expected.

Although it has been suggested that the addition of glass microspheres may be beneficial, the resulting cured material often has its elastic properties impaired, i.e., reduced elongation property and increased tensile modulus.

It has been disclosed in Japanese Patent Publication, No. 63-191856 that organic hollow microspheres of vinylidene chloride polymer are added to a polyurethane substrate to improve the adhesiveness to the substrate.

The present inventors found that these organic hollow microspheres are capable of affording a light-weight, highly-filled cured substance without degrading the physical characteristics such as elongation property, while providing the advantage of cost reduction.

SUMMARY OF THE INVENTION

The present invention provides a curable composition which comprises:

(A) an oxyalkylene polymer having a silicon containing group(s) that has hydroxy and/or hydrolyzable group(s) bonded to the silicon atom and can be crosslinked by forming a siloxane bond, and (B) hollow microspheres of vinylidene chloride polymer whose true specific gravity is 1 g/cm$^3$ or less.

DETAILED DESCRIPTION OF THE PREFERRED EMBODIMENTS

The oxyalkylene polymer having at least one reactive silicon group which can be used in the present invention (hereinafter referred to as an oxyalkylene polymer (A)) is a known polymer as disclosed in Japanese Patent Publication, Nos. 45-36319, 46-12154, 49-32673 and 52-72998, and Japanese Patent Disclosure, Nos. 50-156599, 51-73561, 54-6096, 55-82123, 55-123620, 55-125121, 55-131022, 55-135135 and 55-137129, and U.S. Pat. No. 3,971,751.

The molecular chain of an oxyalkylene polymer (A) essentially consists of the repeating units as represented by the general formula:

—R$^1$—O—

[where R$^1$ represents a substituted or unsubstituted divalent hydrocarbon group having 1 to 12 carbon atoms].

The main chain of the oxyalkylene polymer may consist only of the repeating units represented by the general formula:

—R$^1$—O—, or it may contain, in addition, other repeating units. When it contains other repeating units, the repeating unit represented by the formula:

—R$^1$—O— should preferably constitute 60% (weight %, unless otherwise stated) or more, or more preferably 80% or more based on the whole weight of the polymer.

R$^1$ in the formula —R$^1$—O— is preferably a substituted or unsubstituted divalent aliphatic hydrocarbon group having 2 to 5 carbon atoms, especially, an aliphatic hydrocarbon group having 3 or 4 carbon atoms. Examples of R$^1$ include —CH(CH$_3$)CH$_2$—, —CH(C$_2$H$_5$)CH$_2$—, —C(CH$_3$)$_2$CH$_2$— and —CH$_2$CH$_2$CH$_2$CH$_2$—, with —CH(CH$_3$)CH$_2$— being preferred. The molecular chain of said oxyalkylene polymer (A) may comprise either one or more than one kind of the repeating unit of the formula —R$^1$—O—.

The reactive silicon group in the oxyalkylene polymer (A) is a well-known functional group and is characterized by its crosslinkability even at room temperature. A typical example of the reactive silicon group is a group represented by the following formula (1).

$$-[-Si(-R^2{}_{2-a})(-X_a)-O-]_m-Si(-R^2{}_{3-b})-X_b \quad (1)$$

Wherein R$^2$ is a monovalent organic group having 1–40 carbon atoms, and when two or more R$^2$ groups are present, they may be the same or different, X is a hydroxy group or a hydrolyzable group, and when two or more X's are present, they may be same or different; a is either 0, 1 or 2; b is either 0, 1, 2 or 3; and the sum of a and b≧1; m is 0 or an integer of 1 to 19, and when m is two or more, a's in —[—Si(—R$^2{}_{2-a}$)(—X$_a$)—O]$_m$— are not necessarily the same.

Among the reactive silicon groups represented by the formula (1), from the viewpoint of economy etc., a group represented by the formula:

$$-Si(-R^2{}_{3-q})-X_q \quad (2)$$

[where R$^2$ represents the same as described above, and q is either 1, 2 or 3] is preferred.

Specific examples of the hydrolyzable group as a sort of X in the formula (1), include a halogen atom, a hydrogen atom, an alkoxy, an acyloxy, a ketoxymate, an amino, an amide, an aminoxy, a mercapto, and an alkenyloxy groups. An alkoxy group such as methoxy and ethoxy group are preferred because it is mildly hydrolyzed and easily handled.

Further, typical examples of $R^2$ in the formula (1) include a substituted or unsubstituted hydrocarbon group having 1–40 carbon atoms and a triorganosiloxy group. Specific examples of $R^2$ include alkyl groups such as methyl, ethyl, etc.; cycloalkyl groups such as cyclohexyl, etc.; aryl groups such as phenyl, etc.; aralkyl groups such as benzyl, etc.; and triorganosiloxy groups represented by the formula, $(R')_3SiO-$ [wherein $R'$ is an organic group having 1–20 carbon atoms, and three $R'$ groups are not necessarily the same] such as trimethylsiloxy, etc. Among these groups a methyl group is particularly preferred.

The oxyalkylene polymer (A) should contain at least one reactive silicon group. For obtaining a sufficient curability, however, it is desirable that the polymer (A) contains at least 1.1, more preferably from 1.5 to 4 reactive silicon groups. Further, the reactive silicon group should be preferably located at the terminal of the molecular chain of the oxyalkylene polymer (A).

The number average molecular weight of the oxyalkylene polymer (A) should be preferably from 3,000 to 50,000 or more preferably from 5,000 to 30,000. The oxyalkylene polymer (A) may be used alone or in a combination of two or more analogues.

The oxyalkylene polymer (A) can be produced through various procedures. One example of the procedures comprises reacting an oxyalkylene polymer having a certain functional group (designated as Y group) with a compound having a functional group capable of reacting with the Y group and a reactive silicon group, to introduce the reactive silicon group into the oxyalkylene polymer.

Specific examples are as follows.

(i) a procedure wherein an oxyalkylene polymer having an unsaturated group and a hydroxysilane compound having a hydrolyzable group such as $HSi(OCH_3)_3$ are allowed to react (hydrosilylation) under the catalytic influence of a Group VIII transition metal compound or such.

(Example of the reaction)

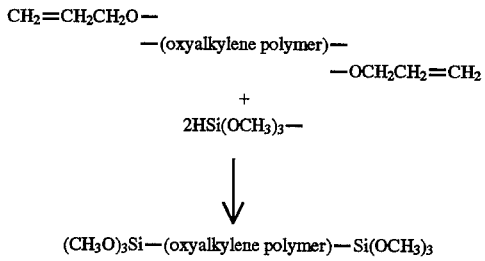

(ii) a second procedure wherein an oxyalkylene polymer having an unsaturated group, and a compound having a mercapto group and a reactive silicon group such as $HS(CH_2)_3Si(OCH_3)_3$ are allowed to addition reaction, and (iii) a third procedure wherein an oxyalkylene polymer having an isocyanate group, and a compound having an active hydrogen group and a reactive silicon group such as $H_2N(CH_2)_3Si(OCH_3)_3$ are allowed to react.

(Example of the reaction)

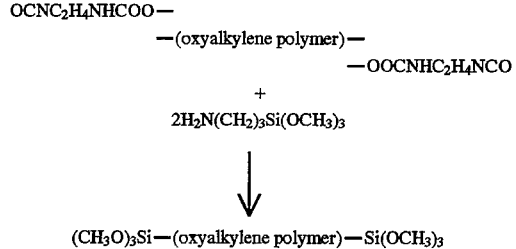

(iv) a fourth procedure wherein an oxyalkylene polymer having a hydroxy group, and a compound having an isocyanate group and a reactive silicon group such as $OCN(CH_2)_3Si(OCH_3)_3$, are allowed to react.

Of those procedures, the one wherein an oxyalkylene polymer having an unsaturated group and a hydrosilane compound are allowed to react is frequently used. The oxyalkylene polymer having an unsaturated group, can be obtained by introducing the unsaturated group into the polymer, utilizing the hydroxy group in that polymer, as disclosed in Japanese Patent Disclosure No. 54-6097 and No. 3-72527.

The oxyalkylene polymer (A) to be used in the present invention is not limited to those obtained through said procedures, but the polymer obtained through any other procedures can be used. The oxyalkylene polymer (A) in this invention also includes the polymer that is obtained by polymerizing polymerizable monomers such as vinyl monomers under the presence of an oxyalkylene polymer (A), or the polymer that is obtained by polymerizing polymerizable monomers under the presence of an oxyalkylene polymer having a hydroxy group and then by introducing a reactive silicon group into it.

The hollow microspheres (balloons) means hollow bodies composed of inorganic or organic materials having each a diameter of 1 mm or less, preferably of 500 µm or less, as described, for example, in "Modern Techniques for Functional fillers (Kinosei fira no saishin-gijutsu)" (CMC).

In the present invention, hollow micro spheres of vinylidene chloride polymer are used which are a sort of organic hollow microspheres. By using these hollow microspheres the tensile modulus of the cured product can be improved (lower modulus of cured product can be achieved) without lowering the elongation property.

The vinylidene chloride polymer used as a material of the hollow microspheres may be a homopolymer of vinylidene chloride or a copolymer with, for example acrylonitrile or others. When a copolymer is used, the amount of the vinylidene chloride unit should preferably be 50 weight % or more of the polymer. The hollow microspheres having their outer surface coated with a thermosetting resin or such may be used.

The hollow microspheres used in this invention should have a true specific gravity of 1 g/cm³ or less, preferably of 0.5 g/cm³ or less, more preferably 0.1 g/cm³ or less, or particularly preferably 0.05 g/cm³ or less.

Examples of the hollow microspheres to be used in the present invention include Saran microspheres (Dow Chemical Co.) called Saran balloons, Exban cells (Japan Fillite), and Matsumoto microspheres (Matsumoto Oil Pharmaceutical).

In the present invention, the hollow microspheres of vinylidene chloride polymer may be used in combination with other hollow microspheres made of inorganic or organic materials.

The inorganic hollow microspheres can be classified into silicate based spheres and nonsilicate spheres: the former includes silas balloons (hollow microspheres mode of volcanic ash), pearlite, glass balloons, silica balloons, fly ash balloons, etc., and the latter includes alumina balloons, zirconia balloons, carbon balloons, etc.

The organic hollow microspheres can be classified into thermoserring spheres and thermoplastic spheres: the former includes phenolic balloons, epoxy balloons, urea balloons, etc., and the latter includes polystyrene balloons, polymethacrylate balloons, polyvinylalcohol balloons, styrene-acrylate polymer balloons, etc. Further, certain thermoplastic spheres have their surface coated with thermosetting resins. A crosslinked thermoplastic sphere may be used. The composition of the present invention may be prepared by formulating the oxyalkylene polymer (A) and a precursor of hollow microsphere, for example a microsphere containing foaming agent, and then foaming the sphere to afford hollow sphere.

The hollow microspheres other than those made of vinylidene chloride polymer are available in the market under various trade names. For example, for a silas balloon, Winlite (Ijichi Chemical) is marketed. For a glass balloon, Micro balloon (Emerson & Cuming), Glass Bubbles (3M), Celamic glass modules (Pittsburgh Corning Corp.), and Cell-star (Asahi Glass) are sold. For a silica balloon, Q-cel (Philadelphia Quartz Co.) is sold. For a fly ash balloon, Cerospheres (PFA Marketing Ltd.) and Fillite (Fillire U.S.A. Inc.) are commercialized.

For an alumina balloon, BW (Showa Denko) is available, while for a zirconia balloon, Hollow zirconium spheres (Zircoa) can be purchased. For a carbon balloon, Kureka Spheres (Kureha Chemicals) and Carbo spheres (General Technologies Corp.) are marketed.

For a phenol balloon, Phenolic microballoons (UCC), for epoxy balloon, Eccospheres EP (Emerson & Cuming), and for urea balloons, ECCO Spheres VF-0 (Emerson & Cuming) is sold.

For a polystyrene balloon, Dylite expandable polystyrene (Arco Polymers Inc.) and Expandable polystyrene beads (BASF Wyandote Corp.) are sold. For a crosslinkable styrene-acrylate balloon, SX863(P) (Japan Synthetic Rubber) is available.

The hollow micro spheres are usually added in an amount of 0.01–100 parts (based on weight unless otherwise stated), preferably 0.1–50 parts, or more preferably 0.3–40 parts per 100 parts of the oxyalkylene polymer (A).

The composition of the present invention may further contain a silanol condensation catalyst, a plasticizer, a filler besides the hollow microspheres, or other additive.

For curing the composition of the present invention, a silanol condensation catalyst (a curing catalyst) may be used. Specific examples of silanol condensation catalysts are: titanate esters such as tetrabutyl titanate, tetrapropyl titanate, etc.; tin carboxylic acid salts such as dibutyl tin dilaurate, dibutyl tin maleate, dibutyl tin diacetate, tin octylate, tin naphthenate, etc.; the reaction products from dibutyl tin oxide and phthalate esters; dibutyl tin acetatylacetonate; oaluminualuminum compounds such as aluminum trisacetyl acetonate, aluminum trisethyl acetoacetate, diisopropoxy aluminum ethyl acetoacetate, etc.; chelate compounds such as zirconium tetraacetyl acetonate, titanium tetraacetyl acetonate, etc.; lead octylate; amine compounds such as butyl amine, octyl amine, dibutyl amine, monoethanol amine, diethanoi amine, triethanol amine, diethylene triamine, triethylene tetramine, oleyl amine, cyclohexyl amine, benzyl amine, diethylaminopropyl amine, xylylene diamine, triethylene diamine, guanidine, diphenyl guanidine, 2,4,6-tris(dimethyl aminomethyl) phenol, morpholine, N-methyl morpholine, 2-ethyl-4-methylimidazole, 1,8-diazabicyclo(5,4,0)undecene-7 (DBU), or the salts of those amine compounds and carboxylic acids and others; low molecular-weight polyamide resins obtained through the reaction between excess polyamines and polybasic acids; the reaction products from excess polyamines and epoxy compounds; and silane coupling agents having amino groups such as γ-aminopropyltrimethoxysilane, N-(β-aminoethyl) aminopropylmethyl dimethoxysilane, etc. Besides, known silanol condensation catalyst can also be used. These catalysts may be used alone or in combination of two or more.

When said silanol condensation catalyst is used, it is added in an amount preferably of from 0.1 to 20 weight parts, or more preferably from 1 to 10 weight parts per 100 parts of the oxyalkylene polymer (A). If the amount of the silanol condensation catalyst is too small relative to the amount of the oxyalkylene polymer (A), the curing rate becomes slowed and the curing reaction does not proceed to a sufficient degree. On the other hand, if the amount of the silanol condensation catalyst is too much, local heat generation or foaming during curing impairs the quality of the cured product.

The composition of the present invention can be further modified by adding thereto various fillers. Examples of the fillers include reinforcing fillers such as fumed silica, precipitating silica, silicic anhydride, hydrated silicate and carbon black, etc.; fillers such as calcium carbonate, magnesium carbonate, diatomaceous earth, calcined clay, clay, talc, titanium oxide, bentonite, organic bentonite, ferric oxide, zinc oxide and activated zinc powder; and fibrous fillers such as glass fiber and filament.

When a high strength cured product is desired fillers such as fumed silica, precipitating silica, silicic anhydride, hydrated silica, carbon black, surface-treated fine powder of calcium carbonate, calcined clay, clay and activated zinc powder are preferably added in an amount of from 1 to 200 parts per 100 parts of the oxyalkylene polymer (A). When a product having a low strength and a great elongation property is desired, fillers such as titanium oxide, calcium carbonate, magnesium carbonate, talc, ferric oxide or zinc oxide are preferably added in an amount of from 5 to 200 parts per 100 parts of the oxyalkylene polymer (A). Needless to say, those fillers can be used alone or in combination of two or more. Particularly when the composition of the present invention comprises a reinforcing filler, light-weight cured product can be obtained, retaining the mechanical strength of the cured product as compared with that of the composition containing solely reinforcing filler.

The composition of the present invention can contain a plasticizer to improve elongation property of the cured product or to enable incorporation of a larger amount of fillers. For example, the following plasticizers may be used alone or in combination of two or more: phthalate esters such as dioctyl phthalate, dibutyl phthalate, butylbenzyl phthalate etc.; aliphatic dibasic acid esters such as dioctyl adipate, isodecyl succinate, dibutyl sebacate, etc.; glycol esters such as diethylene glycol dibenzoate, pentaerythritol ester, etc.; aliphatic esters such as butyl oleate, methyl acetyl ricinoleate, etc.; phosphate esters such as tricresyl phosphate, trioctyl phosphate, octyldiphenyl phosphate, etc.; epoxy plasticizers such as epoxydized soybean oil, benzyl epoxy steareate, etc.; polyester plasticizers such as polyesters resulting from dibasic acids and divalent alcohols; polyethers such as polypropylene glycol and its derivatives; polystyrenes such as poly-α-methylstyrene, polystyrene, etc.; and other plasticizers such as polybutadiene, butadieneacrylonitrile copolymer, polychloroprene, polyisoprene, polybutene, chlorinated paraffin, etc. plasticizer is added usually in an amount of from 0 to 150 parts per 100 parts of the oxyalkylene polymer (A).

In addition to the fillers, plasticizers and condensation catalysts, various additives including adhesion imparting agents such as phenol resin, epoxy resin, etc., pigments, antioxidants, or UV-absorbing agents may be added as needed.

The composition of the present invention can be formulated to either one pack type or two pack type composition. When two pack type composition is prepared, it should be divided into the two components, for example: one component comprising the oxyalkylene polymer (A), filler and plasticizer and the other, a filler, plasticizer and condensation catalyst. The two components are mixed immediately before use. When one pack type composition is prepared the oxyalkylene polymer (A), filler, plasticizer and condensation catalyst is thoroughly removed of moisture and dried, mixed together under the exclusion of water, and preserved in a container like a cartridge, then the content is ready to be used as a one-pack type composition of good storage stability.

The composition of this invention is particularly useful as a one or two pack type elastic sealant, and can be used as a sealing agent for buildings, ships, automobiles, roads and others. Further, alone or with a primer, it can be applied to a wide variety of substrates such as glass, china, lumber, metals, resin molds, etc. so that it can be used as a composition for various types of sealing or adhesive agents. Furthermore, it may be used for food packing materials, injection rubber materials, molding materials, etc.

For further demonstrating this invention, explanation will be given by following Examples.

SYNTHETIC EXAMPLE

A 800 g of an oxypropyrene polymer which has allylether groups introduced into 97% of all the terminals, and having an average molecular weight of 8,000 was placed in a pressure reactor with a stirrer, to which was added 19 g of methyldimethoxy silane, followed by the addition of 0.34 ml of chloroplatinic acid catalyst solution (8.9 g of $H_2.PtCl_6.6H_2O$ dissolved in 18 ml of isopropyl alcohol and 160 ml of tetrahydrofuran). The mixture was allowed to react at 80° C. for 6 hours.

The hydrosilyl group of methyldimethoxy silane in the reaction solution was determined by IR spectrum analysis and it was found that no methyldimethoxy silan was practically present. The amount of reactive silicon groups was determined by NMR, and it was found that the resulting polyoxypropylene had about 1.7 reactive silicon groups $(CH_3O)_2(CH_3)SiCH_2CH_2CH_2O$ per one molecule at its molecular terminals.

Examples 1–3 and Comparative Examples 1–5

A 100 parts (based on weight unless otherwise stated hereinafter) of the polymer synthesized as described in Synthetic Example, and 60 parts of calcium carbonate (Shiraishi Industrial Co., Hakuenka CC-R) are mixed thoroughly with a three-roll paint mill. To the mixture was added 0–10 parts of hollow microspheres and 1 part of dibutyl tin diacetylacetonate (Nitto Chemical, U-220) as a condensation catalyst, and they were kneaded by hand to produce a sheet of 3 mm thick. The sheet was allowed to cure at 23° C. for 3 days, then at 50° C. for 4 days. The sheet then was cut into pieces with a JIS #3 dumbbell in accordance with JIS K 6301, and the test piece was submitted to the tensile strength test using autography at a rate of 200 mm/min. The result is shown in Table 1.

In this Table, the balloon A is hollow microspheres of vinylidene chloride polymer (Matsumoto Microspheres F80ED produced by Matsumoto Oil Pharmaceutical), the balloon B is hollow microspheres of phenolic resin (Ucarphenolic microballoons BJO-0930 by Union carbide), and the balloon C is hollow microspheres of glass (Q-cell #300 by Asahi Glass Co).

M100, TB and EB in table 1 represent modulus at 100% elongation, tensile strength at break and elongation at break, respectively.

TABLE 1

| Examples | Balloon | True specific gravity of balloon | Weight parts | Volume ratio between calcium carbonate and balloons | Tensile strength test M100 kg/cm² | TB kg/cm² | EB % |
|---|---|---|---|---|---|---|---|
| Examples 1 | A | 0.024 | 0.3 | 1/0.5 | 3.9 | 7.9 | 420 |
| Examples 2 | A | 0.024 | 0.6 | 1/1 | 3.7 | 6.9 | 425 |
| Examples 3 | A | 0.024 | 1.2 | 1/2 | 3.4 | 5.5 | 395 |
| Comparative Examples 1 | B | 0.23 | 5 | 1/1 | 4.5 | 6.4 | 420 |
| Comparative Examples 2 | B | 0.23 | 10 | 1/2 | 4.8 | 5.1 | 320 |
| Comparative Examples 3 | C | 0.21 | 5 | 1/1 | 4.8 | 8.2 | 335 |
| Comparative Examples 4 | C | 0.21 | 10 | 1/2 | 5.6 | 8.0 | 265 |
| Comparative Examples 5 | Non | — | — | — | 4.1 | 8.0 | 435 |

As is evident from this table 1, when hollow micro spheres (balloons) of vinylidene chloride polymer is used as a filler, a light-weight cured product having improved (low) modulus can be obtained without degrading its elongation properties.

Three compositions containing further 100 parts of dioctyl phthalate were prepared through similar procedure as examples 1 to 3.

The cured product of the resulting composition was found to have excellent tensile properties as well.

What is claimed is:

1. A curable composition which comprises (A) an oxyalkylene polymer having a silicon-containing group with at least one crosslinkable group bonded to a silicon atom and capable of crosslinking by forming a siloxane bond, said crosslinkable group being a member selected from the group consisting of a hydroxyl group and a hydrolyzable group, and (B) hollow microspheres of vinylidene chloride polymer having a true specific gravity of 0.1 g/cm³ or less.

2. The curable composition according to claim 1, which further comprises a reinforcing filler.

3. The curable composition according to claim 1, wherein said composition contains 0.01 to 100 parts by weight of said hollow microspheres (B) per 100 parts of said oxyalkylene polymer (A).

* * * * *